US012684499B2

(12) United States Patent
Almeida et al.

(10) Patent No.: US 12,684,499 B2
(45) Date of Patent: Jul. 14, 2026

(54) PRECODING AND POWER ALLOCATION FOR ACCESS POINTS IN A CELL-FREE COMMUNICATION SYSTEM

(71) Applicant: Telefonaktiebolaget LM Ericsson (publ), Stockholm (SE)

(72) Inventors: Igor Almeida, Indaiatuba-SP (BR); Eduardo Medeiros, Sundbyberg (BR); Aldebaro Klautau, Marco— Belem— Para (BR); Leonardo Ramalho, Belem— Para (BR); Andrey Nakamura, Belem— Para (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 481 days.

(21) Appl. No.: 18/266,580

(22) PCT Filed: Dec. 11, 2020

(86) PCT No.: PCT/SE2020/051199
§ 371 (c)(1),
(2) Date: Jun. 9, 2023

(87) PCT Pub. No.: WO2022/124956
PCT Pub. Date: Jun. 16, 2022

(65) Prior Publication Data
US 2024/0056989 A1 Feb. 15, 2024

(51) Int. Cl.
*H04W 52/36* (2009.01)
*H04B 7/0456* (2017.01)
(Continued)

(52) U.S. Cl.
CPC ........ *H04W 52/367* (2013.01); *H04B 7/0465* (2013.01); *H04L 25/0242* (2013.01); *H04W 52/346* (2013.01)

(58) Field of Classification Search
CPC .... H04B 7/024; H04B 7/0426; H04B 7/0452; H04B 7/0465; H04L 25/0242; H04W 52/346; H04W 52/367
See application file for complete search history.

(56) References Cited

U.S. PATENT DOCUMENTS 8,488,480 B2 * 7/2013 Han ..................... H04J 11/0056
370/252
8,891,472 B2 * 11/2014 Kim .......................... H04L 1/20
370/329
(Continued)

FOREIGN PATENT DOCUMENTS

WO 2017/003963 A1 1/2017

OTHER PUBLICATIONS

International Search Report and Written Opinion dated Sep. 16, 2021 issued in International Patent Application No. PCT/SE2020/051199 (11 pages).
(Continued)

*Primary Examiner* — Dung B Huynh
(74) *Attorney, Agent, or Firm* — Rothwell, Figg, Ernst & Manbeck, P.C.

(57) ABSTRACT

There is provided mechanisms for determining a precoder for APs in a cell-free communication system. A method is performed by a controller of the APs. The method comprises obtaining channel estimates of a radio propagation channel between the APs and user equipment served in the cell-free communication system. The method comprises determining a precoder for the APs. The precoder has a ZF precoding factor and a power allocation factor. The ZF precoding factor is determined from the channel estimates. The power allocation factor is determined by maximizing total transmission power for all user symbols to be transmitted to the user equipment, one user symbol per each user equipment. Transmission power of each of the APs is not larger than a
(Continued)

power constraint. Transmission power for each of the user equipment is lower bounded by a scaled heuristic value. The method comprises initiating transmission of precoded user symbols from the APs towards the user equipment. The user symbols are precoded according to the determined precoder.

18 Claims, 6 Drawing Sheets

(51) Int. Cl.
H04L 25/02 (2006.01)
H04W 52/34 (2009.01)

(56) References Cited

U.S. PATENT DOCUMENTS

| | | | | |
|---|---|---|---|---|
| 9,369,888 | B2 * | 6/2016 | Forenza | H04L 5/0048 |
| 10,009,148 | B1 * | 6/2018 | Chen | H04W 28/0268 |
| 10,051,588 | B2 * | 8/2018 | Wang | H04W 56/001 |
| 10,129,862 | B1 * | 11/2018 | Wu | H04L 25/0212 |
| 11,139,908 | B2 * | 10/2021 | Gao | H04B 10/11 |
| 11,489,586 | B2 * | 11/2022 | Knopp | H04B 7/18517 |
| 11,617,137 | B1 * | 3/2023 | Huberman | H04W 24/10 |
| | | | | 370/329 |
| 2006/0210070 | A1 * | 9/2006 | Reznik | H04L 63/0428 |
| | | | | 380/33 |
| 2007/0066229 | A1 * | 3/2007 | Zhang | H04B 7/0452 |
| | | | | 455/67.11 |
| 2008/0175183 | A1 * | 7/2008 | Devroye | H04B 7/022 |
| | | | | 370/315 |
| 2009/0323545 | A1 * | 12/2009 | Zhou | H04L 25/024 |
| | | | | 370/252 |
| 2011/0002410 | A1 | 1/2011 | Forenza et al. | |
| 2011/0177834 | A1 * | 7/2011 | Shin | H04J 11/0033 |
| | | | | 455/501 |
| 2012/0140848 | A1 * | 6/2012 | Lin | H04B 7/0691 |
| | | | | 375/296 |
| 2012/0177154 | A1 * | 7/2012 | Sahlin | H04L 25/03318 |
| | | | | 375/341 |
| 2012/0190378 | A1 * | 7/2012 | Han | H04B 7/0639 |
| | | | | 455/452.2 |
| 2012/0207110 | A1 * | 8/2012 | Miao | H04B 7/024 |
| | | | | 370/329 |
| 2012/0224556 | A1 * | 9/2012 | Yoon | H04L 5/0048 |
| | | | | 370/329 |
| 2012/0275426 | A1 * | 11/2012 | Suzuki | H04B 7/0617 |
| | | | | 370/329 |
| 2013/0033989 | A1 * | 2/2013 | Barbieri | H04L 1/0003 |
| | | | | 370/242 |
| 2013/0058307 | A1 * | 3/2013 | Kim | H04L 25/03955 |
| | | | | 370/328 |
| 2013/0088981 | A1 * | 4/2013 | Lv | H04B 7/0478 |
| | | | | 370/335 |
| 2013/0155891 | A1 * | 6/2013 | Dinan | H04W 36/0058 |
| | | | | 370/252 |
| 2013/0155897 | A1 * | 6/2013 | Ihm | H04B 7/024 |
| | | | | 370/252 |
| 2013/0315081 | A1 * | 11/2013 | Kim | H04W 72/541 |
| | | | | 370/252 |
| 2014/0003270 | A1 * | 1/2014 | Maltsev | H04W 52/34 |
| | | | | 370/252 |
| 2014/0010159 | A1 * | 1/2014 | Davydov | H04W 72/21 |
| | | | | 370/328 |
| 2014/0098681 | A1 * | 4/2014 | Stager | H04W 24/02 |
| | | | | 370/252 |
| 2014/0133336 | A1 * | 5/2014 | Park | H04B 7/0626 |
| | | | | 370/252 |
| 2014/0179334 | A1 * | 6/2014 | Forenza | H04B 7/024 |
| | | | | 455/452.2 |
| 2014/0226612 | A1 * | 8/2014 | Kim | H04L 5/0057 |
| | | | | 370/328 |

| | | | | |
|---|---|---|---|---|
| 2015/0003350 | A1 * | 1/2015 | Yu | H04B 7/0452 |
| | | | | 370/329 |
| 2015/0078282 | A1 * | 3/2015 | Chae | H04L 25/03904 |
| | | | | 370/329 |
| 2015/0109949 | A1 * | 4/2015 | Xia | H04B 7/0626 |
| | | | | 370/252 |
| 2015/0236766 | A1 * | 8/2015 | Papadopoulos | H04L 5/0053 |
| | | | | 370/329 |
| 2015/0264699 | A1 * | 9/2015 | Fwu | H04W 72/1215 |
| | | | | 370/329 |
| 2015/0295631 | A1 * | 10/2015 | Yoshimoto | H04B 7/024 |
| | | | | 370/329 |
| 2015/0295671 | A1 * | 10/2015 | Na | H04B 7/0634 |
| | | | | 370/329 |
| 2016/0021551 | A1 * | 1/2016 | Park | H04B 7/0619 |
| | | | | 370/328 |
| 2016/0037550 | A1 * | 2/2016 | Barabell | H04B 17/318 |
| | | | | 455/450 |
| 2016/0050054 | A1 * | 2/2016 | Wager | H04W 76/15 |
| | | | | 455/450 |
| 2016/0056867 | A1 * | 2/2016 | Kusunoki | H04B 7/0456 |
| | | | | 375/267 |
| 2016/0119930 | A1 * | 4/2016 | Yan | H04W 72/23 |
| | | | | 370/329 |
| 2017/0093465 | A1 * | 3/2017 | Molev Shteiman | H04B 7/0413 |
| 2017/0163315 | A1 * | 6/2017 | Wu | H04B 7/024 |
| 2018/0014305 | A1 * | 1/2018 | Nayebi | H04W 72/23 |
| 2018/0109150 | A1 * | 4/2018 | Khan | H02J 50/20 |
| 2018/0159602 | A1 * | 6/2018 | Tsai | H04B 7/0626 |
| 2018/0352465 | A1 * | 12/2018 | Song | H04B 7/022 |
| 2019/0044759 | A1 * | 2/2019 | Hedstrom | H04L 25/03891 |
| 2019/0109628 | A1 * | 4/2019 | Murakami | H04B 7/0682 |
| 2019/0149391 | A1 * | 5/2019 | Kapetanovic | H04B 7/0452 |
| | | | | 375/298 |
| 2019/0215103 | A1 * | 7/2019 | Abdolee | H04L 1/0631 |
| 2020/0037328 | A1 * | 1/2020 | Sridharan | H04W 52/246 |
| 2020/0136705 | A1 * | 4/2020 | Li | H04B 7/0408 |
| 2020/0177241 | A1 * | 6/2020 | Song | H04B 17/382 |
| 2020/0244329 | A1 * | 7/2020 | Xiao | H04B 7/0481 |
| 2020/0367175 | A1 * | 11/2020 | Fukui | H04B 7/06966 |
| 2021/0068060 | A1 * | 3/2021 | Nilsson | H04B 7/0608 |
| 2021/0160823 | A1 * | 5/2021 | Cho | H04W 72/04 |
| 2021/0250067 | A1 * | 8/2021 | Mao | H04B 7/0452 |
| 2021/0250217 | A1 * | 8/2021 | Shattil | H04B 7/0632 |
| 2021/0320698 | A1 * | 10/2021 | Sharafat | H04B 7/0456 |
| 2021/0344439 | A1 * | 11/2021 | Kuchi | H04B 7/0417 |
| 2021/0400509 | A1 * | 12/2021 | Lee | B60W 40/08 |
| 2021/0410075 | A1 * | 12/2021 | Xu | H04W 52/146 |
| 2022/0015041 | A1 * | 1/2022 | Gustavsson | H04W 52/42 |
| 2022/0123795 | A1 * | 4/2022 | Kim | H04B 7/0456 |
| 2022/0159582 | A1 * | 5/2022 | Lu | H04W 52/36 |
| 2022/0303909 | A1 * | 9/2022 | Kwon | H04W 16/28 |
| 2022/0311489 | A1 * | 9/2022 | Rakib | H04L 25/0226 |
| 2023/0041216 | A1 * | 2/2023 | Lu | H04L 25/03331 |
| 2023/0044988 | A1 * | 2/2023 | Gao | H04B 10/11 |
| 2023/0058926 | A1 * | 2/2023 | Boudreau | H04B 7/0452 |
| 2023/0103697 | A1 * | 4/2023 | Kim | H04B 7/06952 |
| | | | | 370/329 |
| 2023/0155643 | A1 * | 5/2023 | Gustavsson | H04B 7/0456 |
| | | | | 375/267 |
| 2023/0223992 | A1 * | 7/2023 | Boudreau | H04B 7/024 |
| | | | | 370/328 |
| 2023/0318667 | A1 * | 10/2023 | Frenger | H04B 7/063 |
| | | | | 370/330 |
| 2024/0056989 | A1 * | 2/2024 | Almeida | H04W 52/346 |
| 2024/0243821 | A1 * | 7/2024 | Cao | H04B 7/0695 |
| 2024/0323993 | A1 * | 9/2024 | Li | H04W 72/542 |
| 2024/0380434 | A1 * | 11/2024 | Sha | H04B 7/063 |
| 2025/0088245 | A1 * | 3/2025 | Ganti | H04B 7/0615 |
| 2025/0192963 | A1 * | 6/2025 | Park | H04L 5/0057 |
| 2025/0330848 | A1 * | 10/2025 | Kim | H04L 5/0057 |

OTHER PUBLICATIONS

Nayebi, E. et al., "Precoding and Power Optimization in Cell-Free Massive MIMO Systems", IEEE Transactions on Wireless Communications, vol. 16, No. 7, Jul. 2017 (15 pages).

(56)               References Cited

OTHER PUBLICATIONS

Ngo, H. Q. et al., "On the Total Energy Efficiency of Cell-Free Massive MIMO", IEEE Transactions on Green Communications and Networking, vol. 2, No. 1, Mar. 2018 (15 pages).

Cheng, H. V., "Optimizing Massive MIMO: Precoder Design and Power Allocation", PHD Thesis, Chapters 3 and 4, Linköping University, 2018 (61 pages).

Interdonato, G. et al., "Downlink Spectral Efficiency of Cell-Free Massive MIMO with Full-Pilot Zero-Forcing", IEEE Global Conference on Signal and Information Processing (GlobalSIP), 2018 (5 pages).

Zhang, Y. et al., "Max-Min Power Optimization in Multigroup Multicast Cell-Free Massive MIMO", 2019 IEEE Wireless Communications and Networking Conference (WCNC), 2019 (6 pages).

Bashar, M. et al., "Enhanced Max-Min SINR for Uplink Cell-Free Massive MIMO Systems", 2018 IEEE International Conference on Communications (ICC), 2018 (6 pages).

Prabhu, H. et al., "Approximative Matrix Inverse Computations for Very-large MIMO and Applications to Linear Pre-coding Systems", 2013 IEEE Wireless Communications and Networking Conference (WCNC): PHY, 2013 (6 pages).

Ngo, H. Q. et al., "Cell-Free Massive MIMO Versus Small Cells", IEEE Transactions on Wireless Communications, vol. 16, No. 3, Mar. 2017 (17 pages).

* cited by examiner

Fig. 3

PRECODING AND POWER ALLOCATION FOR ACCESS POINTS IN A CELL-FREE COMMUNICATION SYSTEM

CROSS REFERENCE TO RELATED APPLICATIONS

This application is a 35 U.S.C. § 371 National Stage of International Patent Application No. PCT/SE2020/051199, filed Dec. 11, 2020.

TECHNICAL FIELD

Embodiments presented herein relate to a method, a controller, a computer program, and a computer program product for determining a precoder for access points (APs) in a cell-free communication system.

BACKGROUND

In cell-free massive multiple input multiple output (CF-mMIMO) communication systems a large number of distributed APs are used to simultaneously serve a small number of user equipment. In CF-mMIMO communication systems all APs can transmit/receive signals to/from all user equipment using the same time/frequency resources. The downlink (DL) transmissions from the APs are coordinated by a central controller, which typically conducts precoding, and power allocation combined with a power optimization algorithm to improve system performance. In general, the goal of the power optimization is to improve some target metric, such as minimum rate, at the same time it meets some requirements, such as transmission power in each antenna, fronthaul usage, or energy efficiency.

Two types of precoding techniques that have been investigated in the context of CF-mMIMO communication systems; conjugate beamforming (CB), and zero-forcing (ZF). The former typically allows for distributed precoding calculation and optimal power allocation by both the APs and the controller. On the other hand, the latter centralizes both tasks on the controller. Thus, ZF precoding typically requires more fronthaul usage than CB. Some results have shown that ZF precoding achieves better performance than CB precoding in terms of max-min signal-to-interference plus noise ratio (SINR), and consequently achieves improved achievable rate.

In the downlink, ZF precoding aims at cancelling interference among the synchronous APs transmissions. In order to find the coefficients of the ZF precoding matrix, the vector of user symbols (with one symbol for each of the user equipment) is multiplied by the pseudo-inverse of the channel matrix. Thus, the ZF precoding matrix normally amplifies the symbols because the channel matrix generally attenuates them. Since the APs are constrained in terms of available transmission power, the transmission power allocated to each symbol should be controlled before the actual precoding takes place.

Another issue is that neither the controller nor the APs have perfect knowledge of the channel matrix representing the radio propagation channel between the APs and the user equipment. A consequence of this is that the ZF precoding might not totally cancel the interference. Thus, even after precoding, some level of interference might be present during receptions of the symbols at the user equipment. Such interference can be measured in terms of SINR. Therefore, the power optimization algorithm might aim at maximizing the minimum SINR among the user equipment to guarantee fairness in the system, given some constraints on the transmission power. The scenario and methods for power allocation are discussed in the following paragraphs.

Considering a scenario of a CF-mMIMO communication system, where a controller is configured to control M distributed single-antenna APs to coherently communicate with K single-antenna user equipment. The symbols received by the user equipment can be represented as a vector:

$$y = Gx + w,$$

where $y \in \mathbb{C}^{K \times 1}$, $G \in \mathbb{C}^{K \times M}$ is the channel matrix, $x \in \mathbb{C}^{M \times 1}$ are the transmitted precoded symbols (one symbol per AP), and $w \in \mathbb{C}^{K \times 1}$ is the vector noise, where $$w \sim N_{\mathbb{C}}(0, I_k \sigma_w^2).$$

When ZF precoding is applied, precoded symbols x are generated in order to cancel interference among the symbols $s \in \mathbb{C}^{K \times 1}$, which have unit average power. Based on the estimated channel matrix $\hat{G}$, the precoded symbols x are found as x=A'Ps, where $$\hat{G}A' = I_K \text{ and } P \in \mathbb{R}_+^{K \times K}$$

is a diagonal power allocation matrix for limiting the transmission power in each AP antenna and thereby optimizing the SINR. The diagonal elements of P are $\sqrt{p_{11}}$, $\sqrt{p_{22}}$, ..., $\sqrt{p_{KK}}$ and $p_{ii}$ is the transmission power associated with the symbol to be transmitted to user equipment i. Such precoding can be applied in a network operating in time-division duplex (TDD) where channel reciprocity can be assumed. Thus, the user equipment can send orthogonal pilot signals from which the APs can estimate the channel matrix and send channel estimates to the controller. More specifically, the ZF precoding matrix can be calculated as $A'=\hat{G}^H(\hat{G}\hat{G}^H)^{-1}$, where $\hat{G}=G-\tilde{G}$ is the estimated channel matrix, where G is the true channel matrix, and where $\tilde{G}$ is the channel estimation error matrix. Each element in G might be modeled as a combination of a large scaling fading factor $\beta_{km}$ and a small scaling fading factor $h_{km}$ between user k and AP m. Thus, $g_{km} = \sqrt{\beta_{km}} h_{km}$, where $h_{km} \sim N_{\mathbb{C}}(0,1)$.

The power allocation matrix P is generally found using an optimization technique that depends on the precoding coefficients and the transmission power constraints of each AP. A typical optimization problem formulated to find the power vector p={$p_1$, ..., $p_K$}, where $p_i=p_{ii}$, that maximizes the minimum $SINR_k$ is expressed as:

$$\max_{p} \min_{k} SINR_k(p)$$

$$\text{subject to} \begin{cases} \sum_{i=1}^{K} |a'_{mi}|^2 p_i \leq \rho_d, m = 1, \dots, M \\ p_i \geq 0, i = 1, \dots, K \end{cases}$$

where $$\sum_{i=1}^{K} |a'_{mi}|^2 p_i$$

is the power transmission of AP m, where $\rho_d$ is the transmission power constraint of each AP given in mW, where $p_i$ is the transmission power associated for user equipment i, where $a'_{mi}$ are the elements of the ZF precoding matrix A', and where $SINR_k(p)$ is the SINR of user equipment k for a given user power allocation p. Then, the power allocation matrix can be written as $$P = \text{diag}\{p\}^{0.5}.$$

The above optimization problem has been shown to be quasi-linear convex and is typically solved using the bisection method, as summarized below:

First, select an initial search interval $[t_l, t_u]$ that contains the optimal value $$t^* = \max_p \min_k SINR_k(p).$$

Second, the midpoint $t=(t_l+t_u)/2$ is calculated and a check is made whether there is a valid solution according to the following optimization problem:

$$\begin{array}{c} \text{find } p \\ \text{subject to} \begin{cases} SINR_i(p) \geq t, i = 1, \dots, K \\ \sum_{i=1}^{K} |a'_{mi}|^2 p_i \leq \rho_d, m = 1, \dots, M \\ p_i \geq 0, i = 1, \dots, K \end{cases} \end{array}$$

Third, if there is a valid solution, then the search interval is updated to $[t_l=t, t_u]$, and otherwise the search interval is updated to $[t_l, t_u=t]$. The second action is then repeated as long as $t_u-t_1 > \epsilon$, for a small $\epsilon$.

The above bisection method could require many iterations of the feasibility problem to achieve a good solution and comes with a high computational cost. A suboptimal heuristic method has therefore been proposed. This suboptimal heuristic method is based on a closed-form equation to calculate the power allocation for ZF precoding based on the transmission power constraint of each antenna $\rho_d$ and the elements of the ZF precoder:

$$p_1 = p_2 = \dots = p_k = \eta = \frac{\rho_d}{\max_m \sum_{i=1}^{K} |a'_{mi}|^2}.$$

With the above heuristic, all symbols have the same power equal to $\eta$, which is limited by the AP with largest precoding energy. Essentially, all symbols use the same power, assuming the worst-case of the ZF precoding matrix. This heuristic method is near-optimal in terms of max-min SINR (and consequently max-min rate) and has extremely low complexity when compared to the bisection method. However, one drawback of this simple method is its low performance when other throughput metrics are evaluated, such as average rate or maximum rate.

Hence, there is still a need for improved determination of the power allocation in terms of having lower computational requirements than the bisection method whilst having better performance than the heuristic method.

SUMMARY

An object of embodiments herein is to provide computationally efficient and high performance determination of the power allocation, as part of the precoding.

According to a first aspect there is presented a controller for determining a precoder for APs in a cell-free communication system. The controller comprises processing circuitry. The processing circuitry is configured to cause the controller to obtain channel estimates of a radio propagation channel between the APs and user equipment served in the cell-free communication system. The processing circuitry is configured to cause the controller to determine a precoder for the APs. The precoder has a ZF precoding factor and a power allocation factor. The ZF precoding factor is determined from the channel estimates. The power allocation factor is determined by maximizing total transmission power for all symbols to be transmitted to the user equipment, one symbol per each user equipment. Transmission power of each of the APs is not larger than a power constraint. Transmission power for each of the user equipment is lower bounded by a scaled heuristic value. The processing circuitry is configured to cause the controller to initiate transmission of precoded symbols from the APs towards the user equipment. The symbols are precoded according to the determined precoder.

According to a second aspect there is presented a method for determining a precoder for APs in a cell-free communication system. The method is performed by a controller of the APs. The method comprises obtaining channel estimates of a radio propagation channel between the APs and user equipment served in the cell-free communication system. The method comprises determining a precoder for the APs. The precoder has a ZF precoding factor and a power allocation factor. The ZF precoding factor is determined from the channel estimates. The power allocation factor is determined by maximizing total transmission power for all symbols to be transmitted to the user equipment, one symbol per each user equipment. Transmission power of each of the APs is not larger than a power constraint. Transmission power for each of the user equipment is lower bounded by a scaled heuristic value. The method comprises initiating transmission of precoded symbols from the APs towards the user equipment. The symbols are precoded according to the determined precoder.

According to a third aspect there is presented a controller for determining a precoder for APs in a cell-free communication system. The controller comprises an obtain module configured to obtain channel estimates of a radio propagation channel between the APs and user equipment served in the cell-free communication system. The controller comprises a determine module configured to determine a precoder for the APs. The precoder has a ZF precoding factor and a power allocation factor. The ZF precoding factor is determined from the channel estimates. The power allocation factor is determined by maximizing total transmission power for all symbols to be transmitted to the user equipment, one symbol per each user equipment. Transmission power of each of the APs is not larger than a power constraint. Transmission power for each of the user equipment is lower bounded by a scaled heuristic value. The controller comprises an initiate module configured to initiate transmission of precoded symbols from the APs towards the user equipment. The symbols are precoded according to the determined precoder.

According to a fourth aspect there is presented a computer program for determining a precoder for in a cell-free communication system, the computer program comprising computer program code which, when run on a controller of the APs, causes the controller to perform a method according to the second aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects have lower computational requirements than the bisection method.

Advantageously, these aspects yield better performance than the heuristic method, for example in terms of average rate or maximum rate.

Advantageously, these aspects achieve fairness among the user equipment similar to the max-min approaches. That is, the minimum rate according to the proposed aspects is similar to the cases when max-min optimization is employed.

Advantageously, these aspects can improve the minimum SINR without modelling the actual SINR in the optimization problem.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 3 is a signalling diagram of methods according to embodiments;

6

Figure 8:
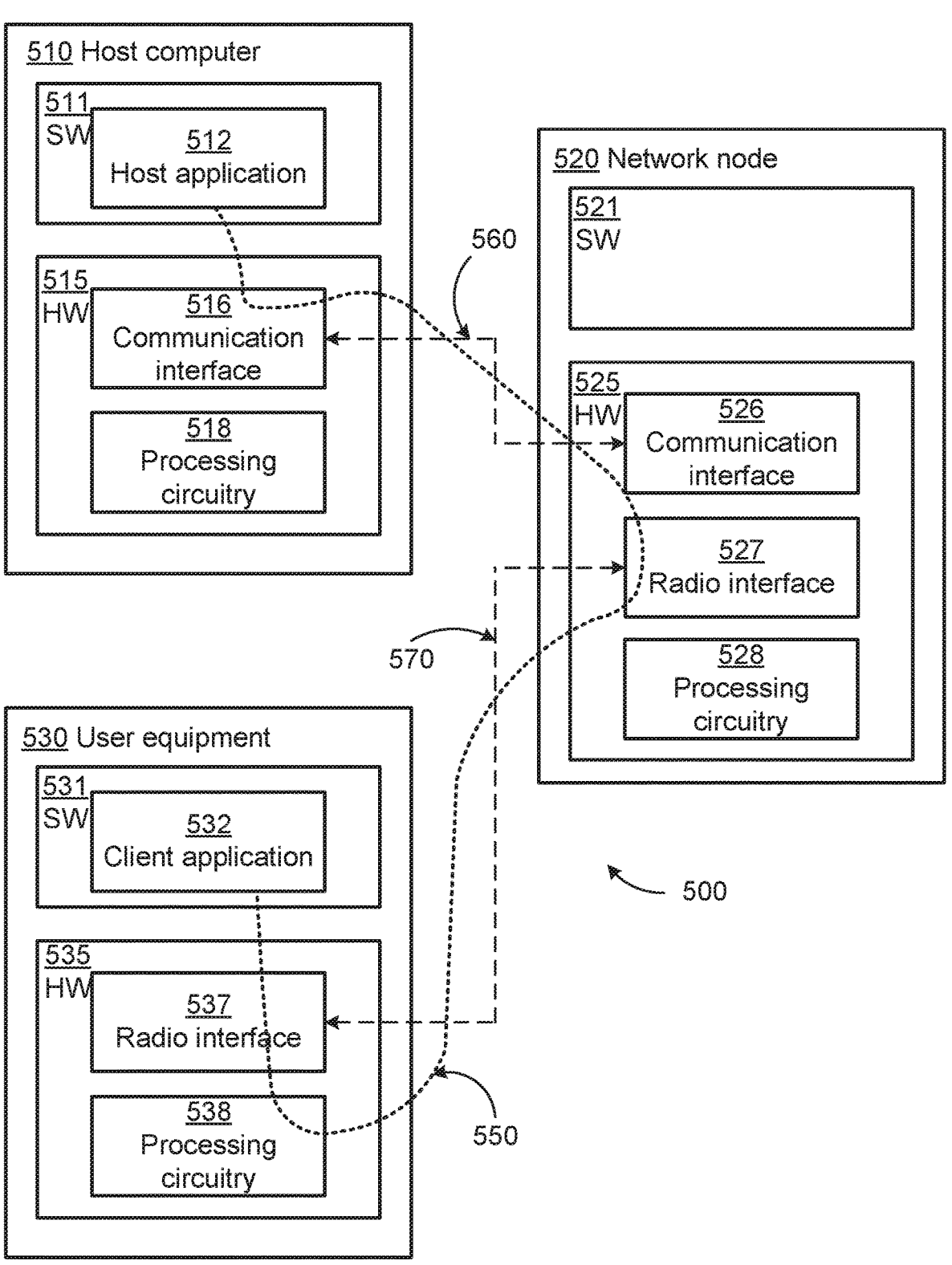

FIG. 8 is a schematic diagram illustrating host computer communicating via a radio base station with a terminal device over a partially wireless connection in accordance with some embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
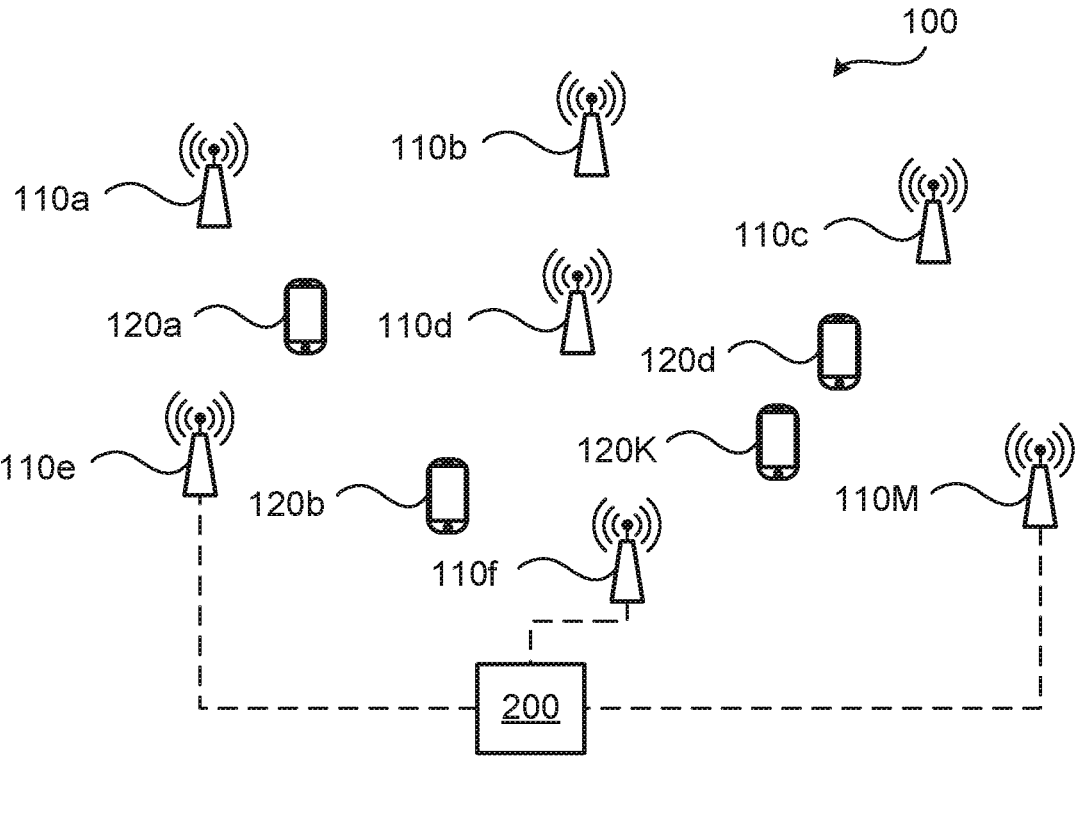
FIG. 1 is a schematic diagram illustrating a communication system according to embodiments.

FIG. 1 is a schematic diagram illustrating a communication system 100 where embodiments presented herein can be applied. The communication system 100 comprises APs 110a:110M that are configured to collectively serve, and thus provide network connectivity to, user equipment 120a: 120K. In this respect, the APs 110a:110M might be configured for time-synchronous transmission of user symbols to the user equipment 120a:120K. Each user equipment 120a: 120K might thus receive the same user symbol from more than one of the APs 110a:110M. The operations of the APs 110a:110M are controlled by a controller 200. Further aspects of the controller will be disclosed below. Each user equipment 120a:120K might be any of a portable wireless device, mobile station, mobile phone, handset, wireless local loop phone, smartphone, laptop computer, tablet computer, network equipped sensor, Internet-of-Things (IoT) device, network equipped vehicle, wearable electronic device.

As noted above, there is still a need for improved determination of the power allocation in terms of having lower computational requirements than the bisection method whilst having better performance than the heuristic method. On the one hand, power allocation based on non-linear max-min SINR (or max-min rate) optimization that uses the bisection method typically requires huge computational cost, especially when the number of APs or user increases. On the other hand, the heuristic method that shows low computational cost has poor performance when average or maximum rates are evaluated. Due to the equal transmission power used for each user equipment, the worst-case coefficients of the ZF precoding matrix limit the serving power of other APs.

The embodiments disclosed herein therefore relate to mechanisms for determining a precoder for APs 110a:110M in a cell-free communication system 100. In order to obtain such mechanisms there is provided a controller 200, a method performed by the controller 200, a computer program product comprising code, for example in the form of a computer program, that when run on a controller 200, causes the controller 200 to perform the method.

Figure 2:
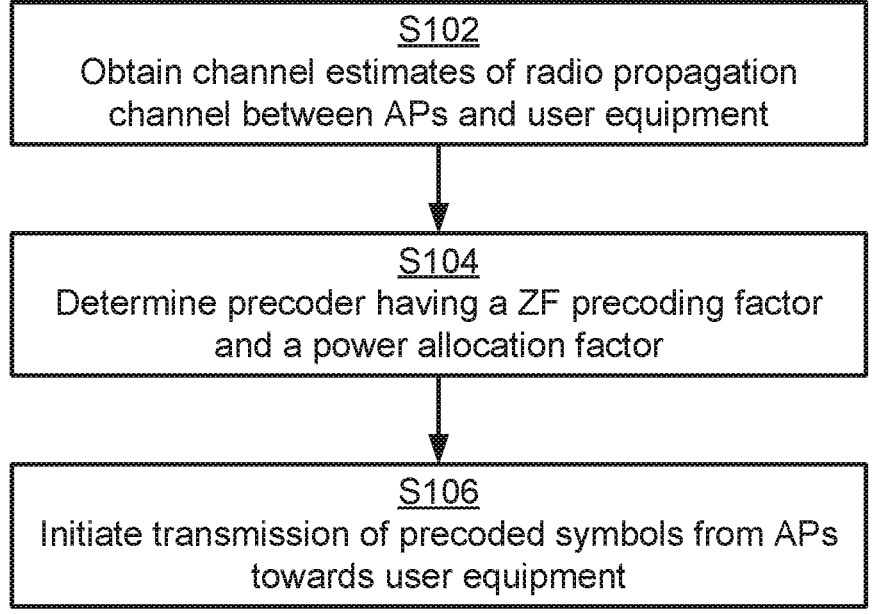
FIG. 2 is a flowchart of methods according to embodiments.

FIG. 2 is a flowchart illustrating embodiments of methods for determining a precoder for APs 110a:110M in a cell-free communication system 100. The methods are performed by the controller 200 of the APs 110a:110M. The methods are advantageously provided as computer programs 620.

S102: The controller 200 obtains channel estimates of a radio propagation channel between the APs 110a:110M and user equipment 120a:120K served in the cell-free communication system 100.

S104: The controller 200 determines a precoder, A, for the APs 110a:110M. The precoder A has a ZF precoding factor, A, and a power allocation factor, P. The ZF precoding factor is determined from the channel estimates. The power allocation factor P is determined by maximizing total transmission power for all user symbols to be transmitted to the user equipment 120a:120K, one user symbol per each user equipment 120a:120K. Transmission power of each of the APs 110a:110M is not larger than a power constraint. Transmission power for each of the user equipment 120a:120K is lower bounded by a scaled heuristic value.

S106: The controller 200 initiates transmission of precoded user symbols from the APs 110a:110M towards the user equipment 120a:120K. The user symbols are precoded according to the determined precoder A.

The aggregated transmission power is thereby maximized at the same time as a minimum SINR is guaranteed by properly constraining the optimization problem pertaining to the determination of the power allocation factor.

Embodiments relating to further details of determining a precoder A for APs 110a:110M in a cell-free communication system 100 as performed by the controller 200 will now be disclosed.

Based on the channel matrix estimation $\hat{G}$, the ZF precoding factor, as represented by a matrix A' can be determined as:

$$A' = \hat{G}^H\left(\hat{G}\hat{G}^H\right)^{-1}.$$

That is, in some embodiments, the ZF precoding factor is represented by a matrix A', and the matrix A' is determined according to the above expression where $\hat{G}$ is a matrix representing the channel estimates. The channel matrix estimation $\hat{G}$ can be found from measurements on pilot signals, for example in terms of reference signals, as commonly used in cellular communication systems.

There may be different ways to determine the power allocation factor P. In some aspects, the power allocation factor P is found by solving an optimization problem, and typically it requires to a non-linear optimization problem to be solved. In some embodiments, the power allocation factor P is determined by solving a linear program problem (i.e., using linear optimization). In other words, the optimization problem can be written as a linear program problem that maximizes the aggregated transmission power, whilst the minimum power for each user symbol is set to be a fraction of the heuristic value.

The power allocation factor can be represented by a matrix P. In some embodiments, the matrix P is determined as $P=\text{diag}\{p^*\}^{1/2}$, where $p^*$ is a vector of optimal power allocation coefficients. The herein disclosed embodiments are based on that setting all power allocation coefficients equal $p_1=p_2=\ldots=p_K=\eta$, where $p_i$ is the i:th power allocation coefficient and $\eta$ is the heuristic value, yield a good approximation of the optimal solution for maximizing the minimum $\text{SINR}_k$. However, as will be disclosed below, not all values $p_i$ need to be equal but rather each value can be individually optimized.

In some embodiments, the total transmission power for all user symbols to be transmitted to the user equipment 120a:120K is maximized by determining:

$$\max_{p^*} \sum_{i=1}^{K} p_i,$$

where $p_i$ is the transmission power per user symbol for user equipment i, where $i=1, \ldots, K$.

In some embodiments, the transmission power of AP m, where $m=1, \ldots, M$, is denoted $P_m$ and is determined as:

$$P_m = \sum_{i=1}^{K} |a'_{mi}|^2 p_i,$$

where $$a'_{mi}$$

are elements of the matrix A'.

The power constraint is denoted $\rho_d$. In some examples, $\rho_d$ is expressed in terms of mW or is converted to mW. The heuristic value is denoted $\eta$. In some embodiments, $\eta$ is determined based on the power constraint $\rho_d$ and the elements of the ZF precoding matrix A' as:

$$\eta = \frac{\rho_d}{\max_m \sum_{i=1}^{K} |a'_{mi}|^2}.$$

The heuristic value $\eta$ then equals the resulting transmission power level in a scenario where all user symbols are allocated the same transmission power and the transmission power constraints of all the APs are met.

The optimization problem can then be formulated as finding the optimal power allocation coefficients $p^*$ that solve the proposed linear program problem, based on the power constraint $\rho_d$, the heuristic value $\eta$ that guarantees maximization of the minimum SINR, the scaling constant $\alpha$ and the elements of the ZF precoding matrix A'. The optimization problem can thus be formulated as:

$$\max_p \sum_{i=1}^{K} p_i$$

$$\text{subject to} \begin{cases} P_m = \sum_{i=1}^{K} |a'_{mi}|^2 p_i \le \rho_d, m = 1, \ldots, M \\ p_i \ge \alpha \cdot \eta, i = 1, \ldots, K, \end{cases}$$

where $0<\alpha<1$ is the scaling constant of the heuristic value $\eta$. That is, in some embodiments, the scaled heuristic value is a heuristic value as scaled with a factor $\alpha$.

Lower values of $\alpha$ give more flexibility for the feasible range of values of the power allocation coefficients p when solving the optimization problem. On the other hand, higher values of $\alpha$ increase the lower bound for p and give less flexibility for the transmission power of each user symbol. Higher values of $\alpha$ also improve the minimum SINR among the user equipment. It has been found through simulations that $\alpha=0.9$ provides good results, in terms of max-min optimization as well as average rate and maximum rate.

In some embodiments the vector of optimal power allocation coefficients p* is found using a linear problem formulated as:

$$\max_{p} f(p) = c^T p$$

$$\text{subject to} \begin{cases} D \cdot p \le b, \\ l_i \le p_i \le u_i, \, \forall \, i, \end{cases}$$

where c is a vector with K ones, where $$d_{ij} = |a'_{ij}|^2,$$

where $b=[\rho_d, \ldots, \rho_d]^T_{K \times 1}$, where $l_i = \alpha \cdot \eta$, and where $u_i = \infty$, $\forall i$. In general terms, $c \in \mathbb{R}^{K \times 1}$ is the coefficient vector of the linear objective function $f(p)$, $D \in \mathbb{R}^{M \times K}$ is a matrix with coefficients of the inequalities constraints, $b \in \mathbb{R}^{M \times 1}$ are the inequality constraints and $D \cdot p \le b$ represents the M linear inequality constraints. Further, the parameters $l_i$ and $u_i$ represent the lower and upper bound, respectively, for each variable $p_i$. Based on the values of c, D, b, $l_i$ and $u_i$, there are different algorithms that can find the optimal solution that maximizes $f(p)$, such as the simplex method, the dual-simplex method, and the interior point method.

As disclosed above, the power allocation factor P can then be determined as $P=\text{diag}\{p^*\}^{1/2}$.

As noted above, the precoder A has a ZF precoding factor A' and a power allocation factor P. When each of the precoding factor A' and the power allocation factor P is represented by a respective matrix, the precoder A can be expressed as:

$$A = A' \cdot P.$$

Here, A' has dimensions M×K, P has dimensions K×K, and A has dimensions M×K. Further, denote by s the user symbols to be transmitted towards the user equipment 120a:120K. Thus, s is a vector containing K user symbols. The user symbols s are then precoded using the precoder A as follows:

$$x = A \cdot s,$$

Where x is a vector containing M precoded symbols (one for each AP 110a:110M) that represents the K user symbols.

Once having determined the precoder A, the actual precoding of the user symbols to be transmitted towards the user equipment 120a:120K might be performed either by the APs 110a:110M or by the controller 200. In a distributed scenario, or implementation, the precoder and the user symbols sent to the APs 110a:110M for precoding at the APs 110a:110M. That is, in some embodiments, initiating transmission of the precoded user symbols in action S106 comprises sending the precoder A (or the ZF precoding factor A' and the power allocation factor P separately) and the user symbols to the APs 110a:110M for precoding of the user symbols at the APs 110a:110M and transmission of the precoded user symbols from the APs 110a:110M. In a centralized scenario, or implementation, the user symbols are precoded by the controller 200 and thus precoded user symbols are sent to the APs 110a:110M. That is, in some embodiments, initiating transmission of the precoded user symbols in action S106 comprises precoding the user symbols at the controller 200 and sending the precoded user symbols to the APs 110a:110M for transmission of the precoded user symbols from the APs 110a:110M.

Figure 3:
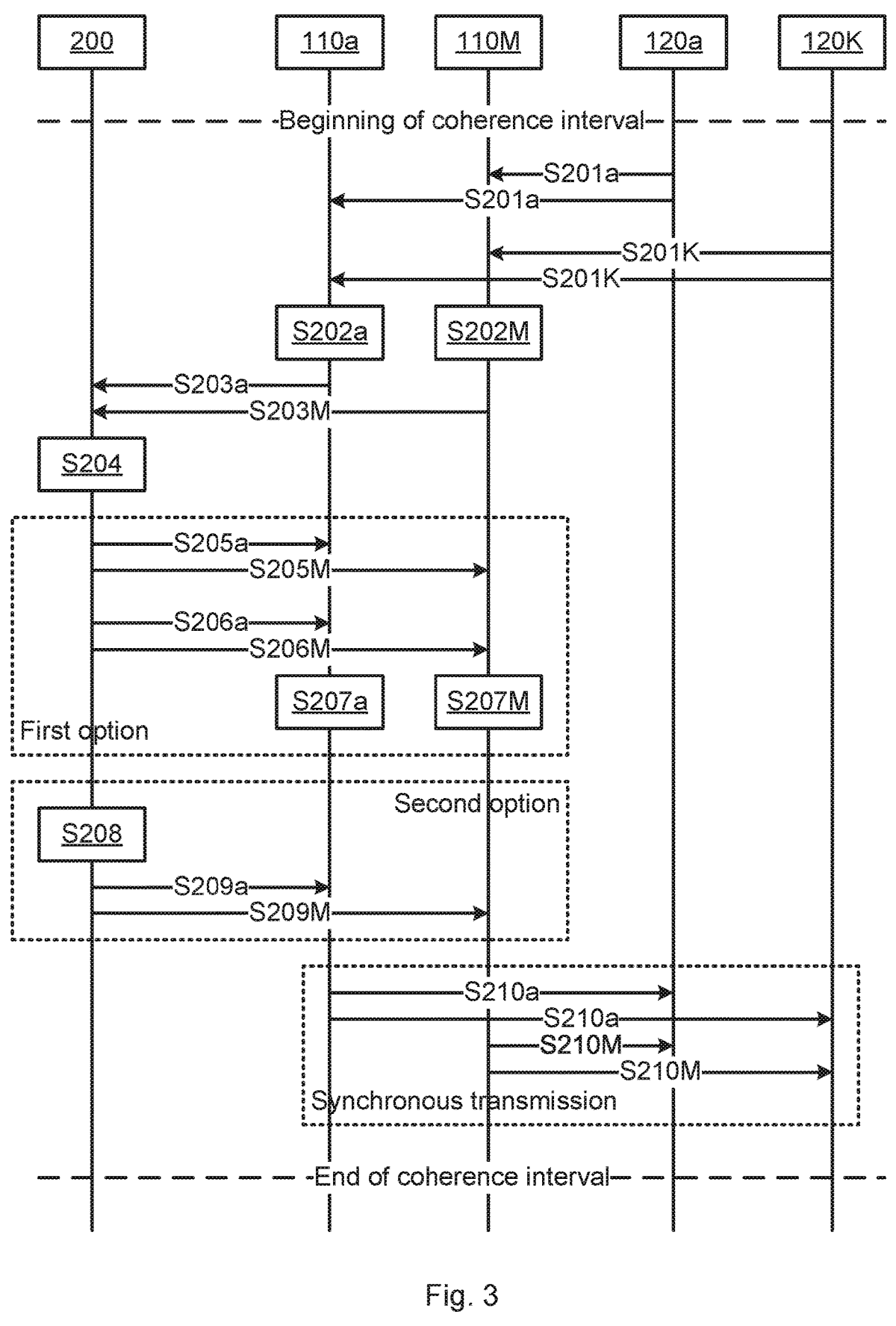

One particular embodiment for determining a precoder A for APs 110a:110M in a cell-free communication system 100 will now be disclosed with reference to the signalling diagram of FIG. 3. In FIG. 3 is illustrated actions performed during one coherence interval. The same actions could be repeated once during each coherence interval.

S201a, S201K: Each user equipment 120a, 120K transmits orthogonal pilot signals that are received by the APs 110a, 110M. It is here noted that each user equipment 120a, 120K does not need to send separate pilot signals to each AP 110a, 110M but rather that one single transmission of one and the same pilot signal from one of the user equipment 120a, 120K can be received by two or more of the APs 110a, 110M S202a, S202M: Each AP 110a, 110M estimates, based on its received pilot signals, the radio propagation channel between itself and each user equipment 120a, 120K it has received a pilot signal from.

S203a, S203M: Each AP 110a, 110M transmits its channel estimates to the controller 200.

S204: The controller 200 determines the ZF precoding factor A' as disclosed above with reference to FIG. 2, i.e., as a pseudo-inverse of the channel matrix, as defined by the channel estimates received from the APs 110a, 110M. The controller 200 determines the power allocation factor P as disclosed above with reference to FIG. 2. The precoding matrix A is found by multiplying A' with P. That is, A=A'·P.

In a first option, representing a scenario with a distributed implementation of the precoding, actions S205-S207 are then performed.

S205a, S205M: The controller 200 sends the precoding matrix to the APs 110a, 110M.

S206a, S206M: The controller 200 sends the user symbols to the APs 110a, 110M.

S207a, S207M: The APs 110a, 110M precode the user symbols by applying the precoding matrix to the user symbols.

In a second option, representing a scenario with a centralized implementation of the precoding, actions S208-S209 are performed instead of actions S205-S207.

S208: The controller 200 precodes the user symbols by applying the precoding matrix to the user symbols.

S209a, S209M: The controller 200 sends the precoded user symbols to the APs 110a, 110M.

S210a, S210M: The APs 110a, 110M synchronously transmit the precoded user symbols towards the user equipment 120a, 120M. It is here thus noted that all occurrences of actions S210a, S210M are simultaneous, i.e., not spread out in time as could be interpreted from FIG. 3.

The herein disclosed embodiments can be deployed in any CF-mMIMO communication system that comprises of any number of APs 110a:110M and user equipment 120a:120K operatively connected to a controller 200 through a fronthaul link between the APs 110a:110M and the controller 200.

In summary, according to the herein disclosed embodiments, the non-linear max-min SINR optimization is implemented to allow a low-cost linear program (LP) method to be used to find the optimal power allocation coefficients, instead of using a high complexity bisection method. The max-min optimization is achieved by appropriate choices of
the constraints in the optimization problem, with a lower
computational cost than the bisection method. More specifi-
cally, by changing the objective function from the max-min
SINR to the maximum aggregated transmitted power, combined with the constraint that guarantees a minimum SINR,
the optimal power allocation coefficients can be found using
a single linear program.

Figure 4:
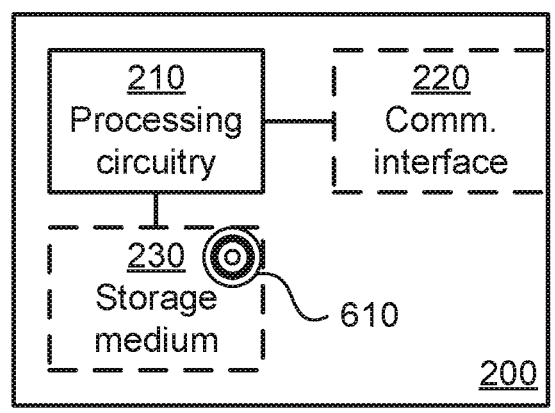
FIG. 4 is a schematic diagram showing functional units of a controller according to an embodiment.

FIG. 4 schematically illustrates, in terms of a number of
functional units, the components of a controller 200 according to an embodiment. Processing circuitry 210 is provided
using any combination of one or more of a suitable central
processing unit (CPU), multiprocessor, microcontroller,
digital signal processor (DSP), etc., capable of executing
software instructions stored in a computer program product
610 (as in FIG. 6), e.g. in the form of a storage medium 230.
The processing circuitry 210 may further be provided as at
least one application specific integrated circuit (ASIC), or
field programmable gate array (FPGA).

Particularly, the processing circuitry 210 is configured to
cause the controller 200 to perform a set of operations, or
actions, as disclosed above. For example, the storage
medium 230 may store the set of operations, and the
processing circuitry 210 may be configured to retrieve the
set of operations from the storage medium 230 to cause the
controller 200 to perform the set of operations. The set of
operations may be provided as a set of executable instruc-
tions.

Thus the processing circuitry 210 is thereby arranged to
execute methods as herein disclosed. The storage medium
230 may also comprise persistent storage, which, for
example, can be any single one or combination of magnetic
memory, optical memory, solid state memory or even
remotely mounted memory. The controller 200 may further
comprise a communications interface 220 at least configured
for communications with the APs 110a:110M. As such the
communications interface 220 may comprise one or more
transmitters and receivers, comprising analogue and digital
components. The processing circuitry 210 controls the gen-
eral operation of the controller 200 e.g. by sending data and
control signals to the communications interface 220 and the
storage medium 230, by receiving data and reports from the
communications interface 220, and by retrieving data and
instructions from the storage medium 230. Other compo-
nents, as well as the related functionality, of the controller
200 are omitted in order not to obscure the concepts pre-
sented herein.

Figure 5:
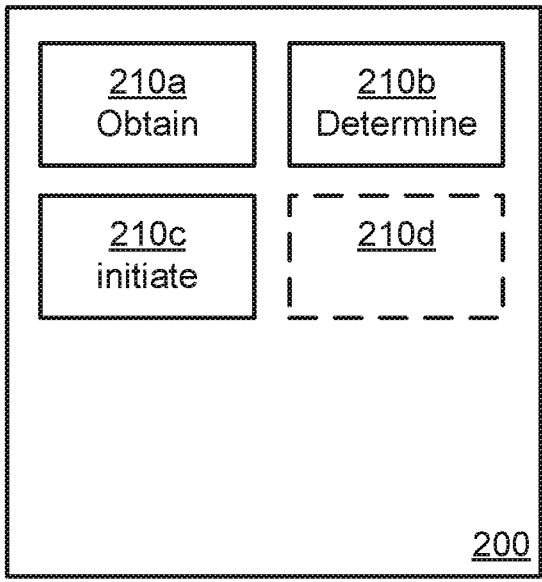
FIG. 5 is a schematic diagram showing functional modules of a controller according to an embodiment.

FIG. 5 schematically illustrates, in terms of a number of
functional modules, the components of a controller 200
according to an embodiment. The controller 200 of FIG. 5 comprises a number of functional modules; an obtain mod-
ule 210a configured to perform action S102, a determine
module 210b configured to perform action S104, and an
initiate module 210c configured to perform action S106. The
controller 200 of FIG. 5 may further comprise a number of
optional functional modules, as represented by functional
module 210d. In general terms, each functional module
210a:210d may in one embodiment be implemented only in
hardware and in another embodiment with the help of
software, i.e., the latter embodiment having computer program instructions stored on the storage medium 230 which
when run on the processing circuitry makes the controller
200 perform the corresponding actions mentioned above in
conjunction with FIG. 5. It should also be mentioned that
even though the modules correspond to parts of a computer
program, they do not need to be separate modules therein,
but the way in which they are implemented in software is dependent on the programming language used. Preferably,
one or more or all functional modules 210a:210d may be
implemented by the processing circuitry 210, possibly in
cooperation with the communications interface 220 and/or
the storage medium 230. The processing circuitry 210 may
thus be configured to from the storage medium 230 fetch
instructions as provided by a functional module 210a:210d
and to execute these instructions, thereby performing any
actions as disclosed herein.

The controller 200 may be provided as a standalone
device or as a part of at least one further device. For
example, the controller 200 may be provided in a node of a
radio access network or in a node of a core network.
Alternatively, functionality of the controller 200 may be
distributed between at least two devices, or nodes. These at
least two nodes, or devices, may either be part of the same
network part (such as the radio access network or the core
network) or may be spread between at least two such
network parts. In general terms, instructions that are
required to be performed in real time may be performed in
a device, or node, operatively closer to the APs 110a:110M
than instructions that are not required to be performed in real
time. Thus, a first portion of the instructions performed by
the controller 200 may be executed in a first device, and a
second portion of the of the instructions performed by the
controller 200 may be executed in a second device; the
herein disclosed embodiments are not limited to any par-
ticular number of devices on which the instructions per-
formed by the controller 200 may be executed. Hence, the
methods according to the herein disclosed embodiments are
suitable to be performed by a controller 200 residing in a
cloud computational environment. Therefore, although a
single processing circuitry 210 is illustrated in FIG. 4 the
processing circuitry 210 may be distributed among a plu-
rality of devices, or nodes. The same applies to the func-
tional modules 210a:210d of FIG. 5 and the computer
program 620 of FIG. 6.

Figure 6:
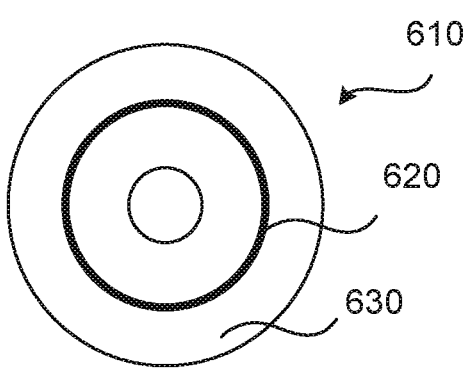
FIG. 6 shows one example of a computer program product comprising computer readable storage medium according to an embodiment.

FIG. 6 shows one example of a computer program product
610 comprising computer readable storage medium 630. On
this computer readable storage medium 630, a computer
program 620 can be stored, which computer program 620
can cause the processing circuitry 210 and thereto opera-
tively coupled entities and devices, such as the communi-
cations interface 220 and the storage medium 230, to
execute methods according to embodiments described
herein. The computer program 620 and/or computer pro-
gram product 610 may thus provide means for performing
any actions as herein disclosed.

In the example of FIG. 6, the computer program product
610 is illustrated as an optical disc, such as a CD (compact
disc) or a DVD (digital versatile disc) or a Blu-Ray disc. The
computer program product 610 could also be embodied as a
memory, such as a random access memory (RAM), a read-
only memory (ROM), an erasable programmable read-only
memory (EPROM), or an electrically erasable program-
mable read-only memory (EEPROM) and more particularly
as a non-volatile storage medium of a device in an external
memory such as a USB (Universal Serial Bus) memory or a
Flash memory, such as a compact Flash memory. Thus,
while the computer program 620 is here schematically
shown as a track on the depicted optical disk, the computer
program 620 can be stored in any way which is suitable for
the computer program product 610.

Figure 7:
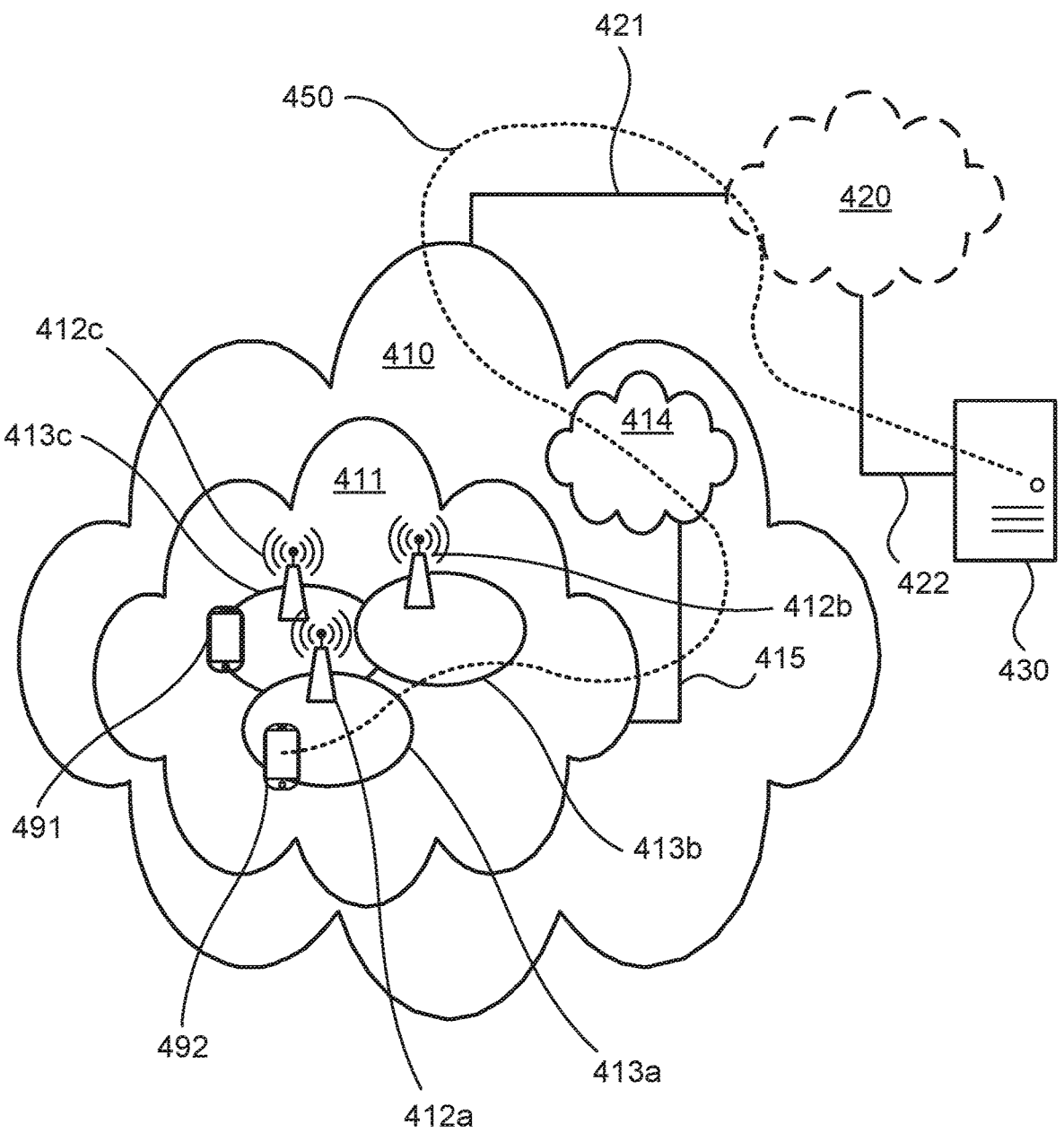
FIG. 7 is a schematic diagram illustrating a telecommunication network connected via an intermediate network to a host computer in accordance with some embodiments.

FIG. 7 is a schematic diagram illustrating a telecommu-
nication network connected via an intermediate network 420
to a host computer 430 in accordance with some embodi-
ments. In accordance with an embodiment, a communication system includes telecommunication network 410, such as a 3GPP-type cellular network, which comprises access network 411, and core network 414. Access network 411 comprises a plurality of radio access network nodes 412a, 412b, 412c, such as NBs, eNBs, gNBs (each corresponding to the APs 110a:110M of FIG. 1) or other types of wireless access points, each defining a corresponding coverage area, or cell, 413a, 413b, 413c. Each radio access network nodes 412a, 412b, 412e is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the user equipment 120a:120K of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

FIG. 8 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the user equipment 120a:120K of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the APs 110a:110M of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by radio access network node 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 8 may be similar or identical to host computer 430, one of network nodes 412*a*, 412*b*, 412*e* and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A controller for determining a precoder for a set of access points (APs) in a cell-free communication system, the set of APs comprising a first AP and a second AP, the controller comprising processing circuitry, the processing circuitry being configured to cause the controller to:

obtain a first channel estimate of a radio propagation channel between the first AP and a first user equipment (UE) included in a group of UEs served in the cell-free communication system;

obtain a second channel estimate of a radio propagation channel between the first AP and a second UE included in the group of UEs;

obtain a third channel estimate of a radio propagation channel between the second AP and the first UE;

obtain a fourth channel estimate of a radio propagation channel between the second AP and the second UE;

determine a precoder, A, for the set of APs, the precoder having a zero-forcing (ZF) precoding factor, A', and a power allocation factor, wherein the ZF precoding factor is determined using the obtained channel estimates, the power allocation factor is determined by maximizing total transmission power for all user symbols to be transmitted to the UEs included in the group of UEs, one user symbol per each UE, transmission power of each of the APs is not larger than a power constraint, and transmission power for each of the UEs in the group of UEs is lower bounded by a scaled heuristic value; and initiate transmission of precoded user symbols from the APs towards the UEs, wherein the user symbols are precoded according to the determined precoder.

2. The controller of claim 1, wherein the power allocation factor is determined by solving a linear program problem.

3. The controller of claim 1, wherein the power allocation factor is represented by a matrix P, wherein the matrix P is determined as P=diag $\{p^*\}^{1/2}$, where $p^*$ is a vector of optimal power allocation coefficients.

4. The controller of claim 3, wherein the total transmission power for all user symbols to be transmitted to the UEs is maximized by determining:

$$\max_{p^*} \sum_{i=1}^{K} p_i,$$

where $p_i$ is the transmission power per user symbol for user equipment i, where i=1, . . . , K.

5. The controller of claim 4, wherein the ZF precoding factor is represented by a matrix A', and wherein the matrix A' is determined as:

$$A' = \hat{G}^H (\hat{G}\hat{G}^H)^{-1},$$

where $\hat{G}$ is a matrix representing the channel estimates.

6. The controller of claim 5, wherein the transmission power of AP m, where m=1, . . . , M, is denoted $P_m$ and is determined as:

$$P_m = \sum_{i=1}^{K} |a'_{mi}|^2 p_i,$$

where $a'_{mi}$ are elements of the matrix A'.

7. The controller of claim 5, wherein the power constraint is denoted $\rho_d$.

8. The controller of claim 7, wherein the heuristic value is denoted $\eta$ and is determined as:

$$\eta = \frac{\rho_d}{\max_m \sum_{i=1}^{K} |a'_{mi}|^2}.$$

9. The controller of claim 8, wherein the linear program problem is formulated as:

$$\max_p f(p) = c^T p$$

$$\text{subject to} \begin{cases} Dp \le b, \\ l_i \le p_i \le u_i, \forall\, i, \end{cases}$$

where c is a vector with K ones, where $$d_{ij} = |a'_{ij}|^2,$$

where $b=[\rho_d, \ldots, \rho_d]^T_{K\times 1}$, where $l_i=\alpha\cdot\eta$, and where $u_i=\infty$, $\forall i$.

10. The controller of claim 1, wherein the scaled heuristic value is a heuristic value as scaled with a factor $\alpha$, where $0<\alpha<1$.

11. The controller of claim 1, wherein
the heuristic value is a function of the power constraint and maximum per-antenna transmit power with respect to the ZF precoding factor.

12. A method for determining a precoder for a set of access points (APs) in a cell-free communication system, the set of Aps comprising a first AP and a second AP, the method being performed by a controller of the APs, the method comprising:
obtaining a first channel estimate of a radio propagation channel between the first AP and a first user equipment (UE) included in a group of UEs and user equipment served in the cell-free communication system;
obtaining a second channel estimate of a radio propagation channel between the first AP and a second UE included in the group of UEs;
obtaining a third channel estimate of a radio propagation channel between the second AP and the first UE;
obtaining a fourth channel estimate of a radio propagation channel between the second AP and the second UE;
determining a precoder, A, for the set of APs, the precoder having a zero-forcing, ZF, precoding factor, A', and a power allocation factor,
wherein the ZF precoding factor is determined using the obtained channel estimates, and
wherein the power allocation factor is determined by maximizing total transmission power for all user symbols to be transmitted to the UEs included in the group of UEs, one user symbol per each UE, wherein transmission power of each of the APs is not larger than a power constraint, and wherein transmission power for each of the UEs in the group of UEs is lower bounded by a scaled heuristic value; and
initiating transmission of precoded user symbols from the APs towards the UEs, wherein the user symbols are precoded according to the determined precoder.

13. The method of claim 12, wherein the power allocation factor is determined by solving a linear program problem.

14. The method of claim 12, wherein the power allocation factor is represented by a matrix P, wherein the matrix P is determined as $P=\text{diag }\{p^*\}^{1/2}$, where p* is a vector of optimal power allocation coefficients.

15. The method of claim 14, wherein the total transmission power for all user symbols to be transmitted to the UEs is maximized by determining:

$$\max_{p^*} \sum_{i=1}^{K} p_i,$$

where $p_i$ is the transmission power per user symbol for user equipment i, where $i=1, \ldots, K$.

16. The method of claim 14, wherein the ZF precoding factor is represented by a matrix A', and wherein the matrix A' is determined as:

$$A' = \hat{G}^H (\hat{G}\hat{G}^H)^{-1},$$

where $\hat{G}$ is a matrix representing the channel estimates.

17. The method of claim 16, wherein the transmission power of AP m, where $m=1, \ldots, M$, is denoted $P_m$ and is determined as:

$$P_m = \sum_{i=1}^{K} |a'_{mi}|^2 p_i,$$

where $$a'_{mi}$$

are elements of the matrix A'.

18. A non-transitory computer readable storage medium storing a computer program for determining a precoder for a set of access points (APs) in a cell-free communication system, the set of APs comprising a first AP and a second AP, the computer program comprising computer code which, when run on processing circuitry of a controller of the APs, causes the controller to:
obtain a first channel estimate of a radio propagation channel between the first AP and a first user equipment (UE) included in a group of UEs served in the cell-free communication system;
obtain a second channel estimate of a radio propagation channel between the first AP and a second UE included in the group of UEs;
obtain a third channel estimate of a radio propagation channel between the second AP and the first UE;
obtain a fourth channel estimate of a radio propagation channel between the second AP and the second UE;
determine a precoder, A, for the set of APs, the precoder having a zero-forcing, ZF, precoding factor, A', and a power allocation factor, P,
wherein the ZF precoding factor is determined using the obtained channel estimates, and
wherein the power allocation factor is determined by maximizing total transmission power for all user symbols to be transmitted to the UEs included in the group of UEs, one user symbol per each UE, wherein transmission power of each of the APs is not larger than a power constraint, and wherein transmission power for each of the UEs in the group of UEs is lower bounded by a scaled heuristic value; and initiate transmission of precoded user symbols from the APs towards the user equipment UEs, wherein the user symbols are precoded according to the determined precoder.

* * * * *